US012426555B2

(12) United States Patent
Jacobsen et al.

(10) Patent No.: US 12,426,555 B2
(45) Date of Patent: Sep. 30, 2025

(54) HYDROPONIC SYSTEM, AND A PROCESS FOR PRODUCING A HYDROPONIC SYSTEM

(71) Applicant: Ellepot A/S, Esbjerg N (DK)

(72) Inventors: Peter Meldgaard Jacobsen, Esbjerg V (DK); Thomas Lindberg Tranberg, Varde (DK)

(73) Assignee: Ellepot A/S, Esbjerg N (DK)

( * ) Notice: Subject to any disclaimer, the term of this patent is extended or adjusted under 35 U.S.C. 154(b) by 118 days.

(21) Appl. No.: 18/029,450

(22) PCT Filed: Oct. 5, 2021

(86) PCT No.: PCT/EP2021/077362
§ 371 (c)(1),
(2) Date: Mar. 30, 2023

(87) PCT Pub. No.: WO2022/078809
PCT Pub. Date: Apr. 21, 2022

(65) Prior Publication Data
US 2023/0345891 A1    Nov. 2, 2023

(30) Foreign Application Priority Data
Oct. 14, 2020   (DK) .......................... PA 2020 01170

(51) Int. Cl.
A01G 31/04    (2006.01)
A01G 9/04     (2006.01)
(52) U.S. Cl.
CPC ........... *A01G 31/042* (2013.01); *A01G 9/047* (2013.01)

(58) Field of Classification Search
CPC ................................ A01G 31/02; A01G 9/047
See application file for complete search history.

(56) References Cited

U.S. PATENT DOCUMENTS

| | | | |
|---|---|---|---|
| 4,020,881 A * | 5/1977 | Nothen | A01G 9/081 53/239 |
| 4,075,785 A | 2/1978 | Jones | |
| 4,312,152 A | 1/1982 | Drury et al. | |
| 5,259,852 A * | 11/1993 | Frances | A01G 9/088 47/84 |
| 6,219,966 B1 * | 4/2001 | Lapointe | A01G 31/02 47/62 C |
| 8,887,438 B2 * | 11/2014 | Visser | A01G 9/0299 47/73 |
| 2006/0151902 A1 * | 7/2006 | Just | B30B 15/302 264/109 |

(Continued)

FOREIGN PATENT DOCUMENTS

EP    3192356 A1    7/2017
GB    1402912 A     8/1975

(Continued)

OTHER PUBLICATIONS

International Search Report from International Application No. PCT/EP2021/077362, date mailed: Jan. 20, 2022

*Primary Examiner* — Joshua D Huson
*Assistant Examiner* — Edgar Reyes
(74) *Attorney, Agent, or Firm* — Morse, Barnes-Brown & Pendleton, P.C.; Sean D. Detweiler, Esq.

(57) ABSTRACT

Hydroponic systems for growing plants, and a corresponding process for line production of the hydroponic systems are provided.

4 Claims, 3 Drawing Sheets

(56) References Cited

U.S. PATENT DOCUMENTS

| | | | |
|---|---|---|---|
| 2014/0115960 A1* | 5/2014 | Kantola | A01G 31/02 47/65.5 |
| 2014/0223815 A1 | 8/2014 | Kuo et al. | |
| 2016/0183486 A1* | 6/2016 | Kabakov | A01G 31/042 47/62 R |
| 2017/0223910 A1* | 8/2017 | Grossman | A01C 1/044 |
| 2018/0064042 A1 | 3/2018 | Sidloski | |
| 2020/0015430 A1* | 1/2020 | Hawley-Weld | A01G 9/047 |
| 2020/0305368 A1 | 10/2020 | Ross | |
| 2021/0007290 A1* | 1/2021 | Ellis | A01G 9/081 |

FOREIGN PATENT DOCUMENTS

| | | | | |
|---|---|---|---|---|
| JP | 2017/060460 A | 3/2017 | | |
| NL | 8000659 A | 9/1981 | | |
| NL | 1000433 C2 | 11/1996 | | |
| WO | 96/03030 A1 | 2/1996 | | |
| WO | 2007/106526 A2 | 9/2007 | | |
| WO | WO-2007106527 A2 * | 9/2007 | | A01G 24/35 |
| WO | 2009/154829 A1 | 12/2009 | | |
| WO | 2017/144904 A1 | 8/2017 | | |
| WO | 2017/216146 A1 | 12/2017 | | |

* cited by examiner

HYDROPONIC SYSTEM, AND A PROCESS FOR PRODUCING A HYDROPONIC SYSTEM

RELATED APPLICATIONS

This application is a national stage filing under 37 U.S.C. 371 of International Application No. PCT/EP2021/077362, filed Oct. 5, 2021, which claims priority to Denmark Application No. PA 2020 01170, filed Oct. 14, 2020. The entire teachings of said applications are incorporated herein by reference herein. International Application PCT/EP2021/077362 was published under PCT Article 21 (2) in English.

TECHNICAL FIELD OF THE INVENTION

The present invention relates to hydroponic production of plants.

BACKGROUND OF THE INVENTION

Hydroponics is a subbranch of hydroculture, which is a method of growing plants with a minimal amount of soil. The nutrients are supplied dissolved in water. The nutrients may be supplied by use of a Nutrient Film Technique (NFT) system. An NFT system is a recirculating hydroponic system that consists of long channels or trays through which a nutrient solution is constantly pumped, creating a nutrient film into which the roots grow. Plants are often started in plastic pots with stone wool inside and then placed in the growing channels or trays. This is very problematic, as there is a dramatic increase of plastic waste in general in the world, and stone wool needs to be collected and deposited. Furthermore, when the herbs are harvested, the plastic pots and stone wool are seldom separated from the root and growth medium, and both parts are therefore not recycled.

EP3192356 discloses a device for hydroponic growth in a modular tank with a U-shaped section adapted to receive a block of compressed growth medium, and a depression formed below the U-shaped section adapted to allow air circulation beneath the growth medium block.

DESCRIPTION OF THE INVENTION

It is an object of the present invention to provide an alternative hydroponic system to replace the environmentally unfriendly system with injection moulded plastic pots with stone wool.

A first aspect relates to a hydroponic system comprising:
an elongated hydroponic reservoir; and
one or more elongated growth medium rods;
wherein said elongated hydroponic reservoir comprises:
a1) one cavity of at least 0.5 meters, extending along the length of said reservoir and adapted for receiving an elongate growth medium rod; and
a2) one elongate growth medium rod positioned on its side within the cavity of said reservoir; or
b1) a plurality of elongated cavities of at least 0.5 meters, each cavity extending along the length of said reservoir, and each cavity adapted for receiving an elongate growth medium rod; and
b2) a plurality of elongated growth medium rods, each elongated growth medium rod positioned on its side within each cavity of said reservoir; wherein said elongated growth medium rod(s) has i) a length of at least 0.5 meters or ii) a length corresponding to the length of said cavity in which it is positioned.

Another aspect relates to a hydroponic system comprising:
an elongated hydroponic reservoir; and
one or more elongated growth medium rods;
wherein said elongated hydroponic reservoir comprises:
one cavity of at least 0.5 meters, extending along the length of said reservoir and adapted for receiving an elongate growth medium rod; and
one elongate growth medium rod positioned on its side within the cavity of said reservoir.

Yet another aspect relates to a hydroponic system comprising:
an elongated hydroponic reservoir; and
one or more elongated growth medium rods;
wherein said elongated hydroponic reservoir comprises:
a plurality of elongated cavities of at least 0.5 meters, each cavity extending along the length of said reservoir, and each cavity adapted for receiving an elongate growth medium rod; and
a plurality of elongated growth medium rods, each elongated growth medium rod positioned on its side within each cavity of said reservoir.

In one or more embodiments, the elongated growth medium rod(s) has i) a length of at least 0.5 meters or ii) a length corresponding to the length of said cavity in which it is positioned.

Preferably, the elongated medium rod(s) comprises an amount of growth medium held in a water and air permeable sheet material.

By using a water and air permeable sheet material, preferably biodegradable, woven or nonwoven, there is no need for the environmentally unfriendly injection moulded plastic pots with stone wool. Rather, the water and air permeable sheet material may be recycled together with the plant roots and growth medium. The sheet material must be water and air permeable in order for the produced rod with plants to be able to absorb water and dissolved nutrients. The hydroponic system may be line produced by the method according to the present invention.

The length of the growth medium rod is at least 0.5 meters or at least corresponding to the length of the cavity, which is at least 0.5 meters. Shorter lengths of 0.3 meters or 0.4 meters, are contemplated by the present invention, but less preferred. Compared to a traditional growth medium pot, which have a bottom end and a top end, this type of growth medium rod is configured with a front end and a rear end as its length requires it to lie down within the cavity of the hydroponic reservoir. This configuration reduces the area of growth medium, which is not covered by the sheet material and thereby reduces the risk of growth medium clogging the hydroponic system's filters, pumps, and tubing recirculating the nutrient solution. The length of the growth medium rod may preferably be within the range of 0.5-20 meters, such as within the range of 1-18 meters, e.g., within the range of 2-16 meters, such as within the range of 3-14 meters, e.g., within the range of 4-15 meters, such as within the range of 5-14 meters, and even more preferably within the range of 5-10 meters.

The term "biodegradable" as used herein describes the chemical dissolution of materials by bacteria or other biological means.

As used herein, the term "nonwoven sheet material" means a sheet material that has a structure of individual fibers or threads, which are interlaid, but not in an identifiable repeating manner. Nonwoven sheet materials may be formed by a variety of processes such as, for example, meltblowing processes, spunbonding processes, coforming processes, airlaying processes, wetlaying processes, and hydroentangling.

The fibers used for the water permeable sheet material are preferably biodegradable, which can be natural or synthetic fibers, e.g., cellulosic fibers, protein fibers or synthetic polymer fibers. Natural fibers can comprise pulped or shredded cellulose fibers, such as wood pulp, shredded wood, shredded paper (tissue, newsprint and the like), straw, cotton fiber, composted vegetation, fibrous sphagnum moss, peat moss, shredded stalks including shredded corn stalks and shredded pine straw (including needles, twigs, cones and small branches). Shredded vegetation is preferably dry before shredding. Protein fibers can e.g., be hair or gelatin. Biodegradable synthetic fibers can comprise reconstituted cellulose fibers, such as rayon fibers, vinyl polymer fibers, such as fibrous polyvinyl alcohol, poly lactic acid, and polyamide fibers.

The term "cellulosic fibers" as used herein describes fibers made from an organic compound derived primarily from plants such as trees.

The term "wood pulp fibers" as used herein describes a type of cellulosic fiber made from a lignocellulosic fibrous material prepared by chemically or mechanically separating cellulosic fiber from plants such as trees or cotton.

The term "regenerated/reconstituted cellulosic fibers" as used herein describes a type of cellulosic fiber made from wood pulp using a solvent fiber spinning process. The process involves dissolving wood pulp in a solvent and spinning the resultant spinning solution into fibers.

In one or more embodiments, the biodegradable and water permeable sheet material consist of spunlaced fibers without fiber binding materials. The term "spunlaced" as used herein refers to a structure of individual fibers or threads, which are physically entangled, without thermal bonding. Physical entanglement may be achieved using a water entanglement process, or alternatively, a needling process or a combination of both processes. The spunlaced fibers provide the strength to the water permeable sheet without the need for a binder, also, and very importantly for the present use, when the water permeable sheet is wet.

In order for the water permeable sheet material to be sealable, at least some of the fibers should preferably be made from, or coated with, a thermoplastic material.

Alternatively, the water permeable sheet material could be coated with a hotmelt composition. Another method for sealing the sheet material tube may be to emboss or sew the sheet parts together.

In one or more embodiments, the water permeable sheet material is heat sealable.

In one or more embodiments, the water and air permeable sheet material comprises a) fibers coated with a thermoplastic material and/or b) fibers of a thermoplastic material; and wherein the sealings are made by heating.

In one or more embodiments, the sheet material is formed as a tube or cylinder covering the amount of growth medium.

In one or more embodiments, the tubular, or cylindrical sheet material is open in at least one of the ends.

In one or more embodiments, the growth medium rod comprises a plurality of cavities positioned along its length. The cavity may in some embodiments be formed in the growth medium rod without penetrating or perforating the water and air permeable sheet material but could in other embodiments penetrate and perforate the water and air permeable sheet material. The distance between the cavities depends on the type of plant to be grown, but could e.g., be within the range of 3-30 cm, such as within the range of 4-25 cm, preferably within the range of 5-20 cm, e.g., within the range of 10-15 cm. The cavity is adapted for receiving a seed or a seedling. The seedling may be a potted seedling, and hence, the cavity may be adapted for receiving a plant pot or bag. The plant pot or bag preferably consists of the same materials as the growth medium rod. Obviously, such a pot or bag is relatively smaller than the growth medium rod with the cavities. The cavity may be formed by drilling or indentation. A drilled cavity is preferably suitable for receiving a seedling in a plant pot or bag, and the cavity is formed by drilling through the side of the growth medium rod that is facing upwards when positioned within the reservoir, i.e., the sheet material is penetrated. An indented cavity is preferably suitable for receiving a seed and may be formed by punching a dibble into the side of the growth medium rod that is facing upwards when positioned within the reservoir. For an embodiment where the sheet material should be penetrated, the dibble is preferably configured with a cutting edge or other cutting means.

In one or more embodiments, a plurality of said cavities each contains one or more seeds.

In one or more embodiments, a plurality of said cavities each are filled with a seedling, such as a seedling in a plant pot or bag.

In one or more embodiments, the cavities are distributed at equidistance along the length of said growth medium rod.

In one or more embodiments, the growth medium rod is pre-seeded with seeds in or on the growth medium, preferably with a predefined distance between said seeds. This may be performed by positioning or dropping a seed into the growth medium before the water and air permeable sheet material is sealed around said growth medium.

In one or more embodiments, the elongated hydroponic reservoir is a tube, pipe, or gutter. The length of the elongated hydroponic reservoir may vary, but is preferably at least 2 meters long, such as within the range of 2-50 meters, e.g., at least 3 meters, such as within the range of 3-45 meters, e.g., at least 4 meters, such as within the range of 4-40 meters, e.g., at least 5 meters, such as within the range of 5-35 meters, e.g., at least 6 meters, such as within the range of 6-30 meters, e.g., at least 7 meters, such as within the range of 7-25 meters, e.g., at least 8 meters, such as within the range of 8-20 meters, e.g., at least 9 meters, such as within the range of 9-15 meters, e.g., at least 10 meters.

A process for producing the hydroponic system according to the present invention could comprise the steps of:
i) providing an elongated hydroponic reservoir comprising one or more elongated cavities of at least 0.5 meters, extending along the length of said reservoir and adapted for receiving an elongate growth medium rod; and
ii) positioning an elongated growth medium rod within said one or more cavities; said growth medium rod having a) a length of at least 0.5 meters or b) a length corresponding to the length of said cavity;
wherein said growth medium rod comprises an amount of growth medium held in a water and air permeable sheet material.

The process could further comprise the steps of:
iii) drilling or indenting a plurality of cavities along the length of said growth medium rod; and
iv.a) inserting a seedling in a plant pot or bag into a plurality of cavities of said growth medium rod; and/or
iv.b) positioning or dropping a seed into a plurality of cavities of said growth medium rod.

The process could further comprise the steps of:
iii) drilling or indenting a plurality of cavities along the length of said growth medium rod; and
iv.a) inserting a seedling in a plant pot or bag into a plurality of cavities of said growth medium rod.

The process could further comprise the steps of:
iii) drilling or indenting a plurality of cavities along the length of said growth medium rod; and
iv.b) positioning or dropping a seed into a plurality of cavities of said growth medium rod.

The process could further comprise the steps of:
iii) drilling a plurality of cavities along the length of said growth medium rod; and
iv.b) positioning or dropping a seed into a plurality of cavities of said growth medium rod.

A second aspect relates to a system for use in a process of producing a hydroponic system, comprising:
a conveyor system adapted for transporting an elongated hydroponic reservoir comprising one or more elongated cavities of at least 0.5 meters and extending along the length of said reservoir and adapted for receiving an elongate growth medium rod;
a growth medium rod distributor unit adapted for positioning growth medium rods into said cavity or cavities of said elongated hydroponic reservoir, said growth medium rods having a) a length of at least 0.5 meters or b) a length corresponding to the length of said cavity;
at least one of a drilling unit and indentation unit, the drilling unit adapted for drilling a plurality of cavities along the length of said growth medium rod positioned within said hydroponic reservoir, and the indentation unit adapted for indenting a plurality of cavities along the length of said growth medium rod positioned within said hydroponic reservoir; and
at least one of a seedling delivery unit and a seed delivery unit, the seedling delivery unit adapted for inserting a seedling in a plant pot or bag into a plurality of cavities of said growth medium rod, and the seed delivery unit adapted for positioning or dropping a seed into a plurality of cavities of said growth medium rod; wherein said conveyor system is adapted for transporting an elongated hydroponic reservoir through said growth medium rod distributor unit, at least one of a drilling unit and indentation unit, and at least one of a seedling delivery unit and a seed delivery unit.

The conveyor may comprise one or more conveyors, e.g., a first conveyor positioned upstream to the growth medium rod distributor unit, and a conveyor positioned downstream to the growth medium rod distributor unit. The first conveyor may be a stepper conveyor, which is configured to move the hydroponic reservoir in successive distance movements, also called discrete step increments. The first conveyor may be a belt conveyor driven by an electric stepper motor to producing a torque to the pulley so by friction of the conveyor belt on the powered pulley the conveyor belt and the load is moved in a conveying direction. A stepper motor is commonly used for position control. The use of an electric stepper motor makes the transport of the hydroponic reservoir more controllable, e.g., to change the speed of conveying and move the hydroponic reservoir on the conveyor belt in successive distance movements. These successive distance movements allow the growth medium rod distributor unit, drilling unit, and indentation unit enough time to perform their action at a specific location relative to the hydroponic reservoir. The growth medium rod distributor unit will have time to position a growth medium rod at a specific position within the hydroponic reservoir, and the drilling unit and indentation unit will have enough time to act on a positioned growth medium rod.

The growth medium rod distributor unit may be of any type known within the art being configured for distributing, and optionally also producing, growth medium rods comprising an amount of growth medium held in a water and air permeable sheet material. Suitable types of distributor units may be as disclosed in WO2017216146, WO2017216145, or WO19001944, hereby incorporated by reference.

In one or more embodiments, the distributor apparatus comprises a growth medium rod production unit. Such a unit may be as disclosed in WO1992003914 or WO19011742, hereby incorporated by reference. The main difference is that the length of the rod will be substantially longer than the traditionally produced pot. A fewer number of cuts per time period is obviously needed.

The system also comprises at least one of a drilling unit and indentation/dibbling unit. The drilling unit and the indentation unit may be present in the same system. In this situation, the system further comprises a controller configured for activating either the drilling unit or the indentation unit. The drilling unit is adapted for drilling a cavity in the side of a growth medium rod positioned within the hydroponic reservoir. The drilling unit may e.g., comprise a column drill and optionally means adapted for removing the by the drill removed growth medium. The indentation unit is adapted for indenting a cavity in the side of a growth medium rod positioned within the hydroponic reservoir and may comprise a dibble tool, preferably comprising means adapted for penetrating the rod's sheet material.

The system also comprises at least one of a seedling delivery unit and a seed delivery unit. The seedling delivery unit and the seed delivery unit may be present in the same system. In this situation, the system further comprises a controller configured for activating either the seedling delivery unit or the seed delivery unit.

The seedling delivery unit is adapted for inserting a seedling in a plant pot or bag into a cavity of said growth medium rod. The seedling delivery unit may e.g., comprise a robotic arm or a distributor adapted for positioning or dropping the seedlings positioned in a plant pot or bag into the cavity of the relatively larger growth medium rod positioned within the hydroponic reservoir. The seed delivery unit is adapted for positioning or dropping a seed into a cavity of said growth medium rod, and may e.g., comprise a distributor adapted for positioning or dropping a seed into the cavity of the growth medium rod positioned within the hydroponic reservoir. Such seeding equipment is known within the art and may e.g., be a drumseeder, needleseeder, transplanter, or the like.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

DETAILED EMBODIMENTS OF THE INVENTION

Figure 1:
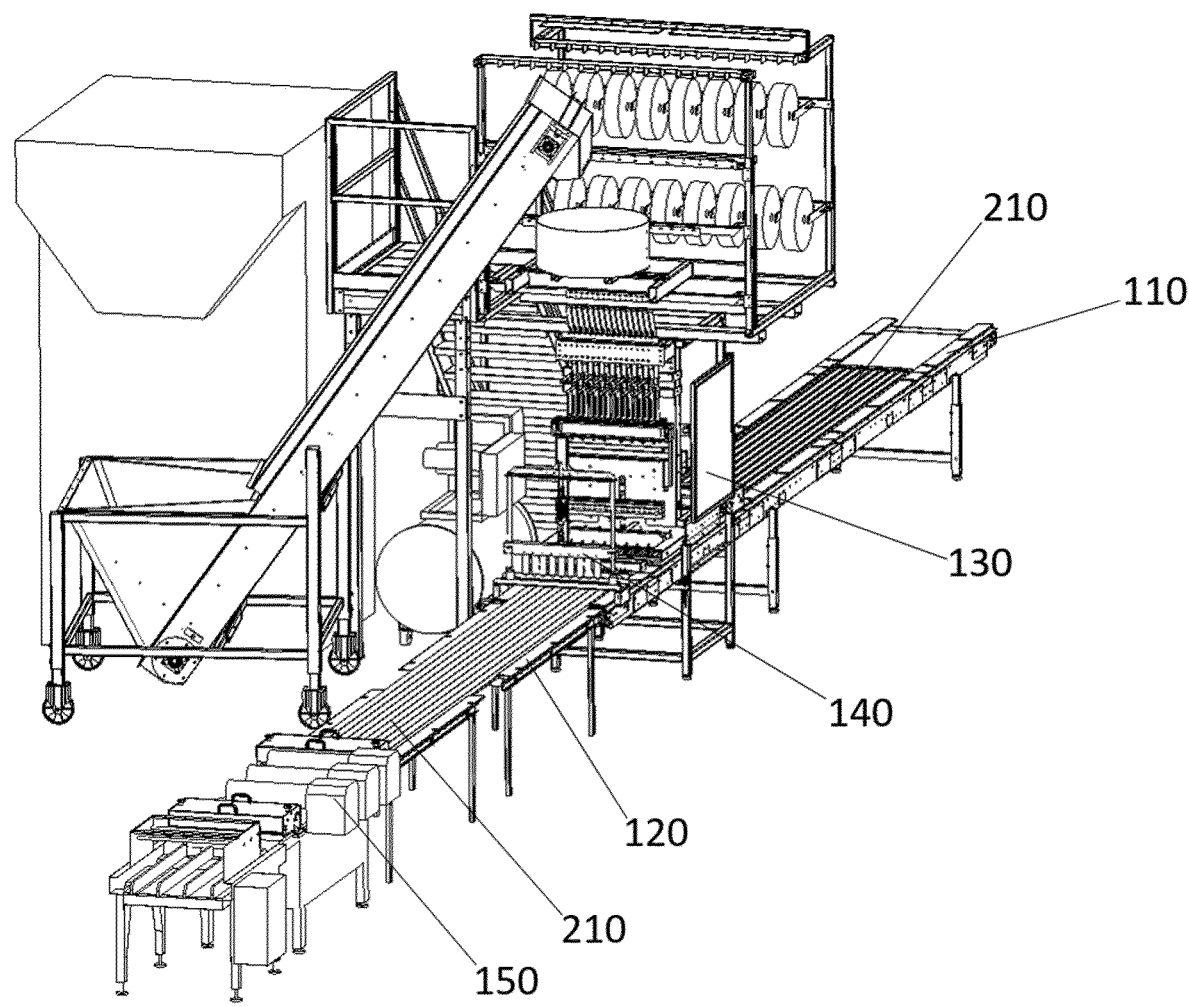
FIGS. 1-3 show different views of systems for line production of a hydroponic system according to various embodiments of the present invention.
Figure 2:
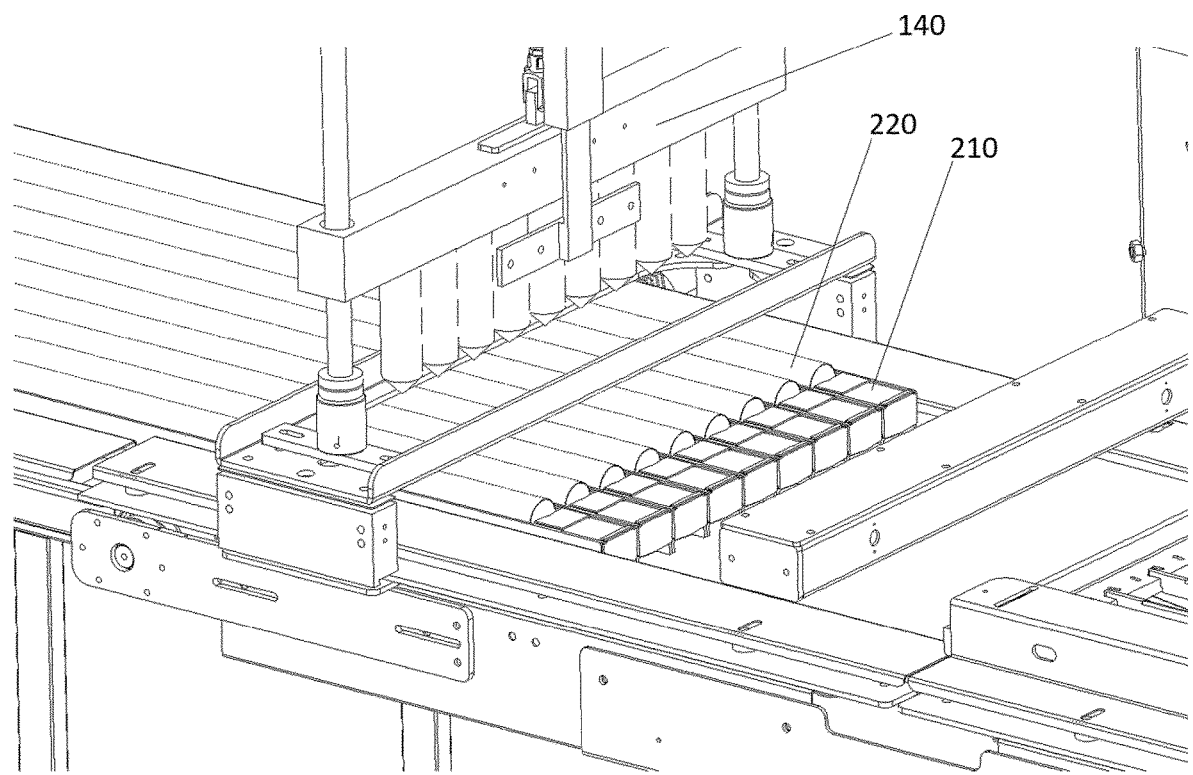
Figure 3:
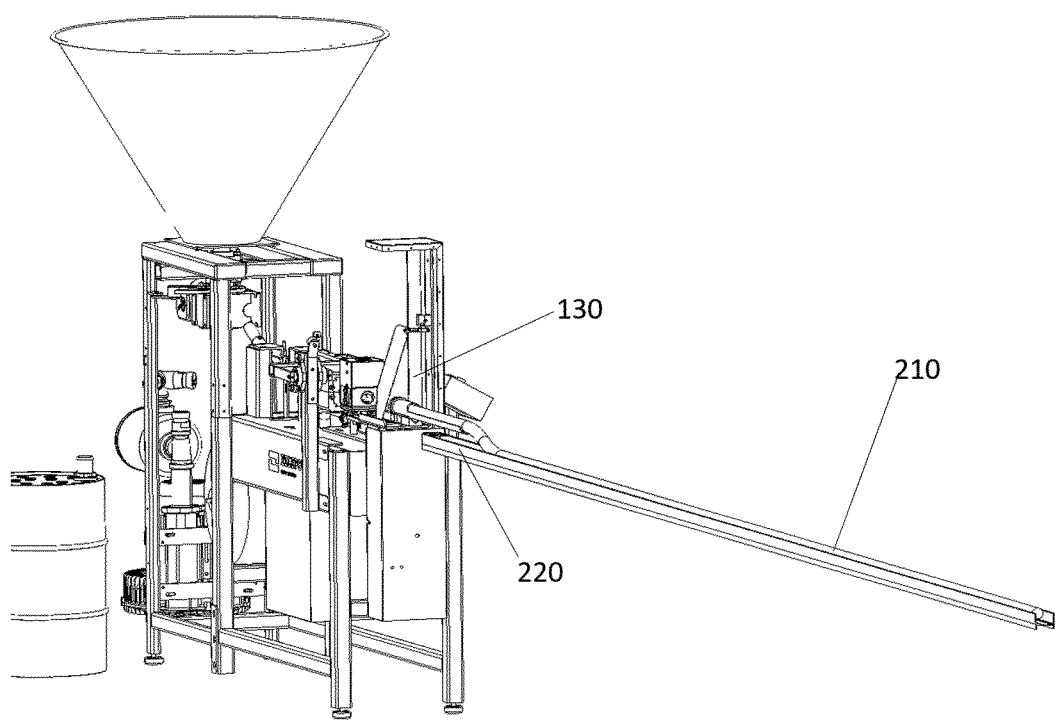

FIGS. 1-3 show different views of systems for line production of a hydroponic system according to various embodiments of the present invention. The shown system is capable of handling nine juxtaposed hydroponic reservoirs at the time but may be used with fewer, such a one, and can also be configured to handle even more. FIG. 1 shows a perspective view of the system. The system comprises a conveyor system 110, 120 adapted for transporting (juxtaposed) elongated hydroponic reservoirs 210; a growth medium rod distributor unit 130 adapted for positioning growth medium rods into elongated hydroponic reservoirs 210; an indentation unit 140 adapted for indenting/dibbling a cavity (not shown) in the side of a growth medium rod positioned within said hydroponic reservoir 210; and a seed delivery unit 150 adapted for positioning or dropping a seed into a formed cavity of each of said growth medium rods. A mechanism adapted for aligning the hydroponic reservoirs 210 before loading the growth medium rod 220 therein is not shown but may be present.

FIG. 2 shows a closeup view of the system at the location of the indentation unit 140. A hydroponic system has just been produced and is forwarded to the seed delivery unit 150 (FIG. 1) adapted for positioning or dropping a seed into a cavity of a growth medium rod 220.

FIG. 3 shows a perspective view of a growth medium rod distributor unit 130 adapted for positioning growth medium rods 220 into an elongated hydroponic reservoir 210. The remaining part of the system is not shown. This apparatus is only capable of filling a single elongated hydroponic reservoir at the time.

REFERENCES

110 Conveyor
120 Conveyor
130 Distributor unit
140 Indentation unit
150 Seed delivery unit
210 Hydroponic reservoir
220 Growth medium rod

The invention claimed is:

1. A system for use in a process of producing a hydroponic system, the system comprising:
an elongated hydroponic reservoir comprising at least one elongated cavity of at least 0.5 meters and extending along the length of said reservoir;
a conveyor system adapted for transporting the elongated hydroponic reservoir;
at least one growth medium rod configured to be received in the elongated hydroponic reservoir; the at least one growth medium rod having a length of at least 0.5 meters, wherein said growth medium rod comprises an amount of growth medium held in a water and air permeable sheet material formed as a tube or cylinder covering the amount of growth medium;
a growth medium rod distributor unit configured to position the at least one growth medium rod into a respective at least one cavity of said elongated hydroponic reservoir;
at least one of a drilling unit or an indentation unit, the drilling unit configured to drill a plurality of cavities along the length of said growth medium rod positioned within said hydroponic reservoir, and the indentation unit configured to indent another plurality of cavities along the length of said growth medium rod positioned within said hydroponic reservoir; and
at least one of a seedling delivery unit or a seed delivery unit, the seedling delivery unit configured to insert a seedling in a plant rod into a cavity of said plurality of cavities of said growth medium rod, and the seed delivery unit configured to position and drop a seed into a said cavity of said plurality of cavities of said growth medium rod;
wherein said conveyor system is configured to transport the elongated hydroponic reservoir through said growth medium rod distributor unit, at least one of the drilling unit or indentation unit, and at least one of the seedling delivery unit or the seed delivery unit.

2. The system according to claim 1, wherein the conveyor system comprises a first conveyor positioned upstream to the growth medium rod distributor unit, and a second conveyor positioned downstream to the growth medium rod distributor unit.

3. The system according to claim 1, wherein the conveyor system comprises a first conveyor positioned upstream to the growth medium rod distributor unit, and a second conveyor positioned downstream to the growth medium rod distributor unit, and wherein the first conveyor is a stepper conveyor configured to move the hydroponic reservoir in successive distance movements.

4. The system according to claim 1, wherein the growth medium rod distributor unit comprises a growth medium rod production unit.

* * * * *